US009321403B1

(12) United States Patent
Nedelman

(10) Patent No.: US 9,321,403 B1
(45) Date of Patent: Apr. 26, 2016

(54) OVERHEAD CONSOLE INCORPORATING AN INTERCHANGEABLE DROP DOWN STORAGE BIN

(71) Applicant: FORD GLOBAL TECHNOLOGIES, LLC, Dearborn, MI (US)

(72) Inventor: Marc David Nedelman, Waterford, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 14/628,429

(22) Filed: Feb. 23, 2015

(51) Int. Cl.
*B60R 7/04* (2006.01)
*B60R 7/08* (2006.01)
*B60R 11/02* (2006.01)
*B60R 1/00* (2006.01)

(52) U.S. Cl.
CPC . *B60R 7/04* (2013.01); *B60R 1/008* (2013.01); *B60R 7/082* (2013.01); *B60R 7/087* (2013.01); *B60R 11/0241* (2013.01); *B60R 11/0258* (2013.01)

(58) Field of Classification Search
CPC ........ B60R 7/087; B60R 1/008; B60R 1/082; B60R 11/0241; B60R 7/04
USPC ................................................. 296/37.7, 37.8
See application file for complete search history.

(56) References Cited

U.S. PATENT DOCUMENTS

| | | | |
|---|---|---|---|
| 5,050,922 A | 9/1991 | Falcoff | |
| 5,620,122 A * | 4/1997 | Tanaka | B60N 3/102 220/264 |
| 6,003,925 A * | 12/1999 | Litke | B60R 7/04 16/319 |
| 6,062,623 A * | 5/2000 | Lemmen | B60R 7/04 224/282 |
| 6,135,528 A * | 10/2000 | Sobieski | B60R 7/04 224/311 |
| 6,176,536 B1 | 1/2001 | Miller et al. | |
| 6,588,624 B1 * | 7/2003 | Connors | E05D 7/12 16/341 |
| 7,025,225 B2 * | 4/2006 | Inari | B60R 7/06 16/285 |
| 7,084,932 B1 * | 8/2006 | Mathias | B60R 11/0211 296/37.7 |
| 7,393,046 B2 * | 7/2008 | Schultz | B60R 13/0225 224/311 |
| 7,440,845 B1 | 10/2008 | Laverick et al. | |
| 7,566,084 B2 * | 7/2009 | Kikuchi | B60R 7/04 188/83 |
| 7,661,741 B2 * | 2/2010 | Takai | B60R 7/04 296/37.1 |
| 8,157,314 B2 | 4/2012 | Gwon | |
| 8,307,505 B2 * | 11/2012 | Harada | B60R 7/06 16/293 |
| 8,505,994 B2 * | 8/2013 | Park | B60R 1/008 296/24.34 |
| 8,646,825 B2 | 2/2014 | Minelli et al. | |

(Continued)

FOREIGN PATENT DOCUMENTS

JP        2004017810 A  *  1/2004

*Primary Examiner* — Pinel Romain
(74) *Attorney, Agent, or Firm* — Vichit Chea; King & Schickli, PLLC

(57) ABSTRACT

An overhead console assembly for a vehicle includes a plurality of interchangeable storage bin modules each defining at least receivers and a differently sized or shaped storage bin or holder. An overhead console is provided, defining a storage cavity adapted to receive the plurality of storage bin modules. The assembly further includes pins including a first end adapted to be received in the overhead console and a second end adapted to be received in one of the receivers. Each of the interchangeable storage bin module differently sized or shaped storage spaces is independently configured to hold a different item. One of the pin first ends includes a gear for interfacing with a dampener. Another of the pin first ends is associated with a biasing member adapted to apply a closing force to a one of the interchangeable storage bins held in the overhead console storage cavity.

18 Claims, 5 Drawing Sheets

(56) References Cited

U.S. PATENT DOCUMENTS

2012/0175204 A1* 7/2012 Arnold .................. F16F 9/32
                                                  188/271

2013/0193706 A1* 8/2013 Minelli .................. B60R 7/082
                                                  296/37.8

* cited by examiner

US 9,321,403 B1

OVERHEAD CONSOLE INCORPORATING AN INTERCHANGEABLE DROP DOWN STORAGE BIN

TECHNICAL FIELD

This disclosure relates generally to consoles for a motor vehicle. More particularly, the disclosure relates to consoles incorporating interchangeable storage bins or holders providing convenient storage for a range of useful items. In embodiments, the console is mounted to a vehicle passenger cabin roof and the storage bins or holders are drop-down pivoting bins or holders.

BACKGROUND

A variety of personal items including sunglasses, electronic devices such as GPS-based navigational devices, personal music players, and the like are desirable and/or useful to a motor vehicle operator during operation of the vehicle. It is inconvenient and potentially unsafe for such items to be simply placed loose in the vehicle. For that reason, motor vehicle users require convenient places to store and hold such personal items, from which the items can be conveniently accessed prior to or even during operation of the vehicle. Consider as an example an operator driving a vehicle on a cloudy day, when during the drive the clouds part, the sun shines, and the operator then requires her sunglasses. As another example, the operator may need to consult a GPS/navigational device for directions while traveling to an unfamiliar destination. Conventional storage options designed into motor vehicles include storage bins incorporated into, for example, glove boxes, consoles, overhead consoles, center stack consoles, instrument panels, door map pockets, seatback pockets and the like.

Of course, motor vehicles typically include storage bins of an appropriate size to receive a variety of differently sized and shaped items. However, storage of a small item in a large storage bin, particularly in a vehicle that will be moving, turning, braking, etc. during operation, allows the item to shift during vehicle operation. This could potentially result in damage to the stored item. Also, the noise created by the item shifting about in the storage bin is unpleasant and potentially distracting to the vehicle operator. In turn, the operator may have certain items as discussed above that are required during operation of the vehicle. Having to search for such items in a large storage bin holding numerous other items presents inconvenience and potentially a hazard to the operator, particularly if the operator finds that she has need of the item while operating the vehicle.

Thus, particularly for storage of and ready access to small but useful and frequently used items, it is known to provide storage bins adapted specially for the items. As non-limiting examples, it is known to provide dedicated storage bins configured to be capable only of holding sunglasses. Likewise, it is known to provide storage bins configured only to hold GPS and other small electronic devices, and others. Such storage bins lack versatility because they typically hold only the specific item which they were designed to hold, and may not be able to accommodate other differently sized and/or shaped devices. As a result a need exists for additional storage options in the interior trim of a motor vehicle.

SUMMARY

In accordance with the purposes and benefits described herein, an overhead console storage system is provided for a motor vehicle. That storage system comprises an overhead console including a storage bin cavity. A plurality of interchangeable pivoting drop-down storage bins/holders are provided, each configured to be received in the overhead console storage bin cavity.

In embodiments, the overhead console storage system includes a housing defining at least an overhead storage cavity adapted to receive a plurality of interchangeable storage bin modules. Opposed slots are provided for rotatably receiving a pair of pivot pins. A plurality of interchangeable pivoting drop-down storage bin modules each define at least a differently sized or shaped bin or holder and a pair of opposed receivers each configured for a snap-fit engagement of a one of the pair of pivot pins. Each of the plurality of interchangeable storage bin modules may be independently configured to hold a different item.

In embodiments, first and second pivot pins are provided to allow pivoting the storage bin module, each pin including a first end adapted to be rotatably received in the overhead console opposed slots and a second end adapted to be non-rotatably engaged by a one of the receivers. A biasing member is configured to apply a closing force to a one of the plurality of interchangeable storage bin modules received in the housing storage cavity. The biasing member may be a torsion spring.

A damper is associated with the second pivot pin, configured to provide a smooth opening motion of the one of the plurality of interchangeable storage bin modules received in the housing storage cavity. In embodiments, the damper is a spring-loaded rotational gear associated with the housing and a cooperating second pivot pin-associated gear meshing with the rotational gear.

In the following description, there are shown and described several preferred embodiments of the described overhead console storage system. As it should be realized, the overhead console storage system is capable of other, different embodiments and its several details are capable of modification in various, obvious aspects all without departing from the instrument panel storage system as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the instrument panel storage system and together with the description serve to explain certain principles thereof. In the drawing figures.

DETAILED DESCRIPTION

Reference will now be made in detail to the present preferred embodiments of the overhead console storage system, examples of which are illustrated in the accompanying drawing figures.

Figure 1:
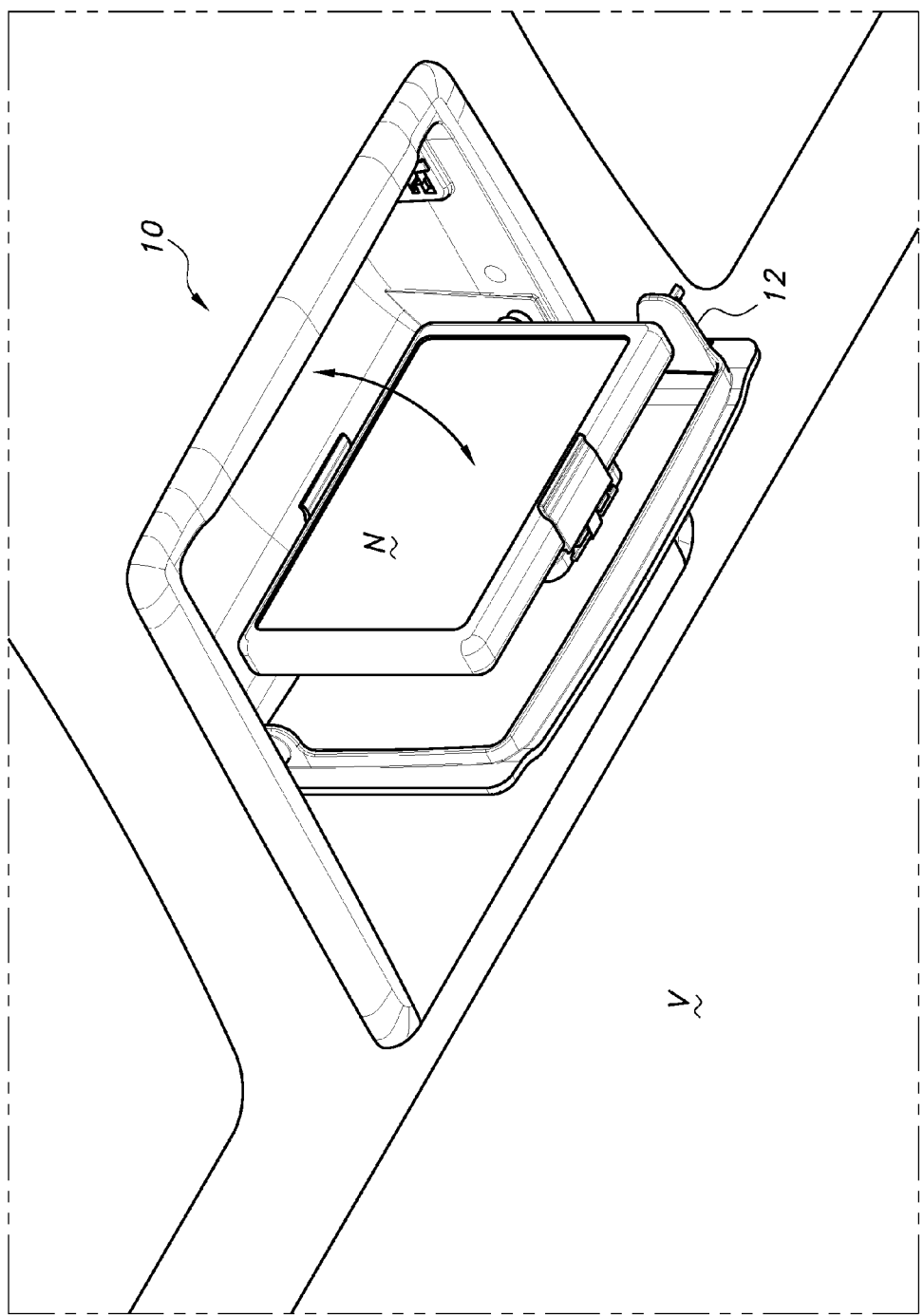
FIG. 1 is a perspective view of the interior of a motor vehicle including an overhead console having a drop-down pivoting storage bin/holder.

Reference is now made to FIG. 1 illustrating the interior of a motor vehicle V including an overhead console 10, further including a drop down storage bin or holder 12 configured, in the depicted example, a holder for a GPS/navigational device N. As depicted, the overhead console 10/storage bin or holder 12 lacks versatility because it can only hold a particular GPS/navigational device N, or at most a different item having the same dimensions as the GPS/navigational device N.

Figure 2:
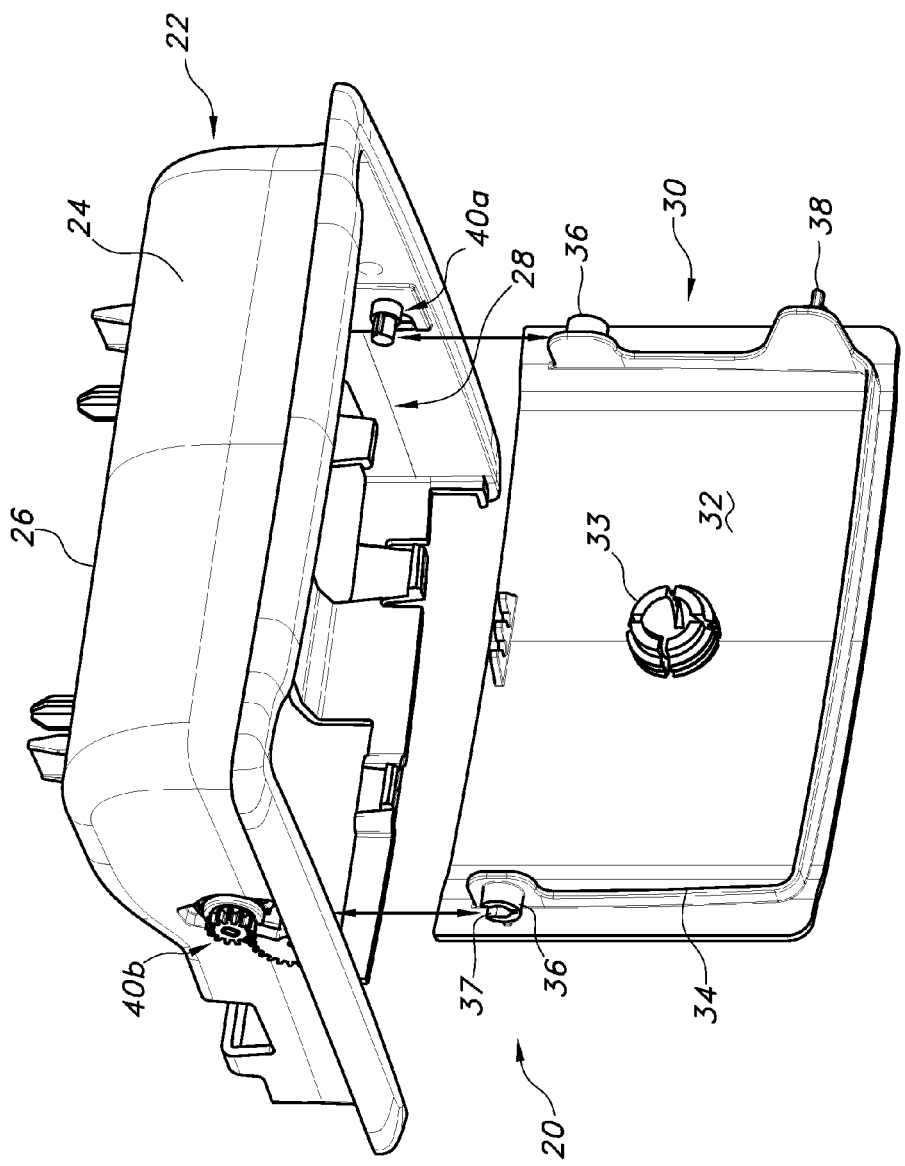
FIG. 2 is an exploded view of an overhead console including an interchangeable drop-down pivoting storage bin/holder according to the present disclosure.

To solve this problem of lack of versatility, with reference to FIG. 2 the present disclosure provides an overhead console system 20 including an overhead console housing 22 including a side wall 24 and a roof 26 together defining a storage cavity 28. Storage cavity 28 releasable receives a plurality of interchangeable pivoting drop-down storage bin modules 30. The depicted embodiment of a storage bin module 30 includes a floor 32 and at least one side wall 34 together defining a pivoting holder for an item. The storage bin module 30 depicted in FIG. 2 is configured as including a snap in feature 33 for a GPS/navigational device holder (as shown in FIG. 1), but as will be described below a variety of storage bin module 30 configurations are contemplated. A closing catch mechanism is provided, which may be as simple as a tab or pin 38 which is frictionally received in a cooperating snap-fit notch (not shown in this view) associated with overhead console 22, or may be a more complicated arrangement such as a push-push lock (not shown) of a design known in the art.

The system 20 further includes a mechanism for releasably receiving and holding storage bin modules 30 in the storage cavity 28 of overhead console housing 22. In an embodiment, each storage bin module 30 side wall 34 includes opposed receivers 36 defined in or attached to a portion thereof. Each receiver 36 is configured to include an opening 37.

Figure 3:
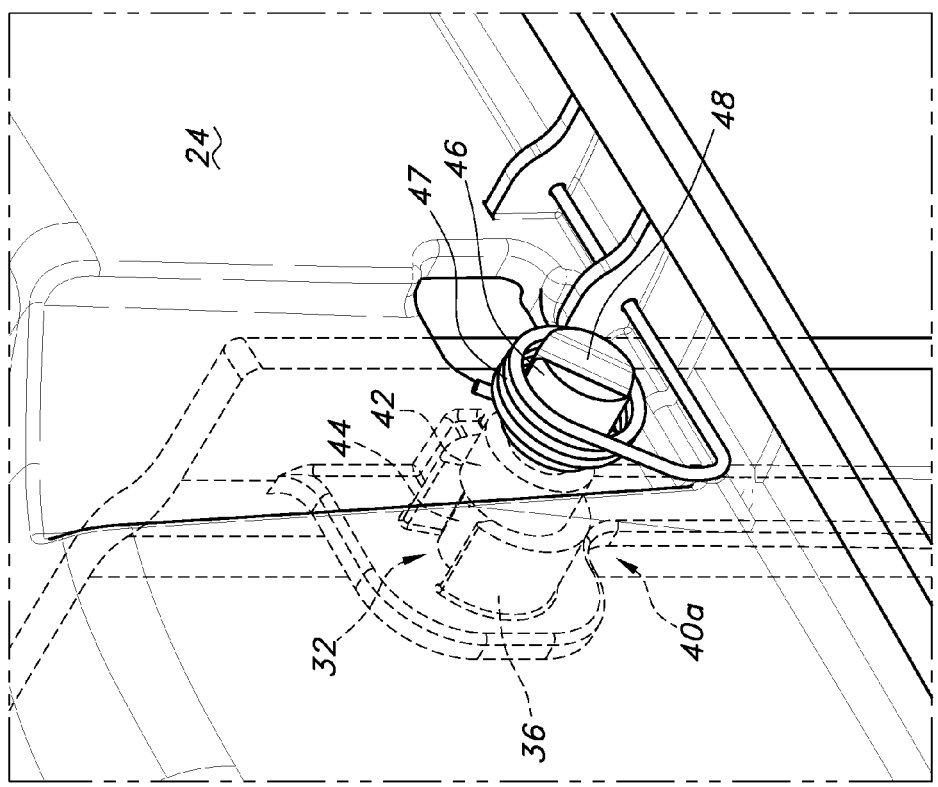
FIG. 3 is an isolated view of a console pin and drop-down receiver for providing a pivoting function to the drop-down pivoting storage bin/holder of FIG. 2.

Overhead console housing side wall 24 includes apertures (not visible in this view) for holding cooperating pivot pins 40. In the depicted embodiment a pair of pivot pins 40a, 40b are provided. With reference to FIG. 3, one pivot pin 40a includes a central hub 42 and a first end 44 dimensioned to be frictionally received in a receiver 36 via opening 37. In an embodiment, the dimensions of first end 44 and receiver 36 are cooperatively keyed whereby rotational movement between first end 44 and receiver 36 is prevented once receiver 36 engages first end 44. An opposed second end 46 of pivot pin 40a is adapted to hold a biasing member 47. In the depicted embodiment, second end 46 includes a slot 48 which receives an end of a biasing member 47 that is a torsion spring. The biasing member 47 is configured to bias pivot pin 40a and so storage bin 30 towards a closed position.

Figure 4:
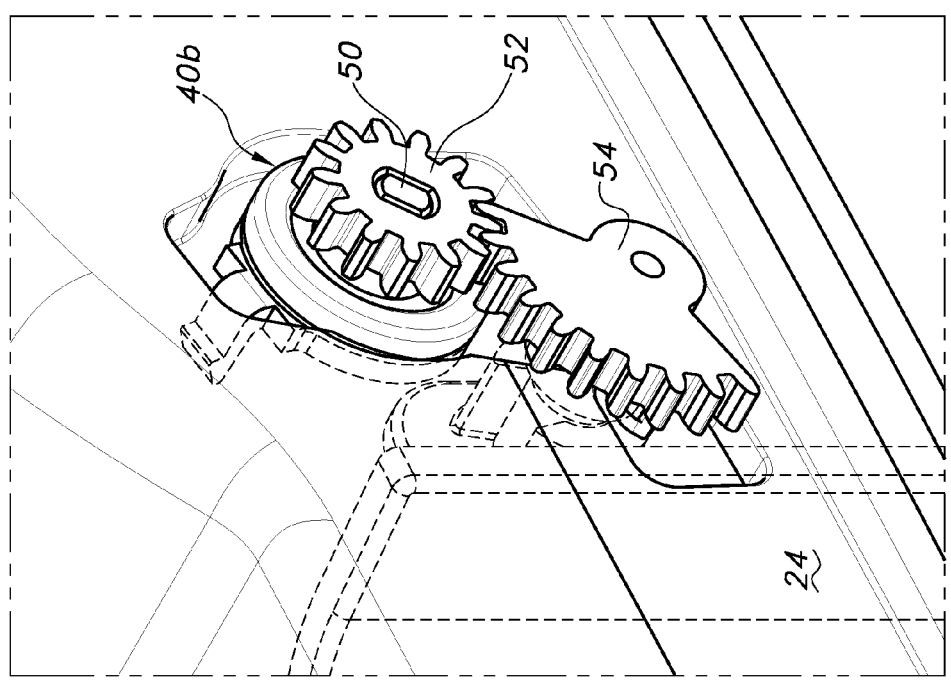
FIG. 4 is an isolated view of a console pin gear and rotational gear damper for the drop-down pivoting storage bin/holder of FIG. 2.

With reference to FIG. 4 another pivot pin 40b includes a central hub 42 and a first end 44 dimensioned to be frictionally received in a receiver 36 via opening 37 (not visible in this view). Again, the dimensions of first end 44 and receiver 36 are cooperatively keyed whereby rotational movement between first end 44 and receiver 36 is prevented once receiver 36 engages first end 44. An opposed second end 50 of pivot pin 40b includes a gear structure 52 adapted to mesh with a damper 54, in the depicted embodiment being a spring (not shown)-loaded rotational gear associated with the housing sidewall 24. The arrangement of gear structure 52/damper 54 provides a smooth resistive force to provide a smooth opening motion of a storage bin module 30. As will be appreciated, gear structure 52 may be integrally formed in the pivot pin second end 50, or may be provided as a separate structure attached to pivot pin second end 50 as shown in FIG. 4.

Figure 5:
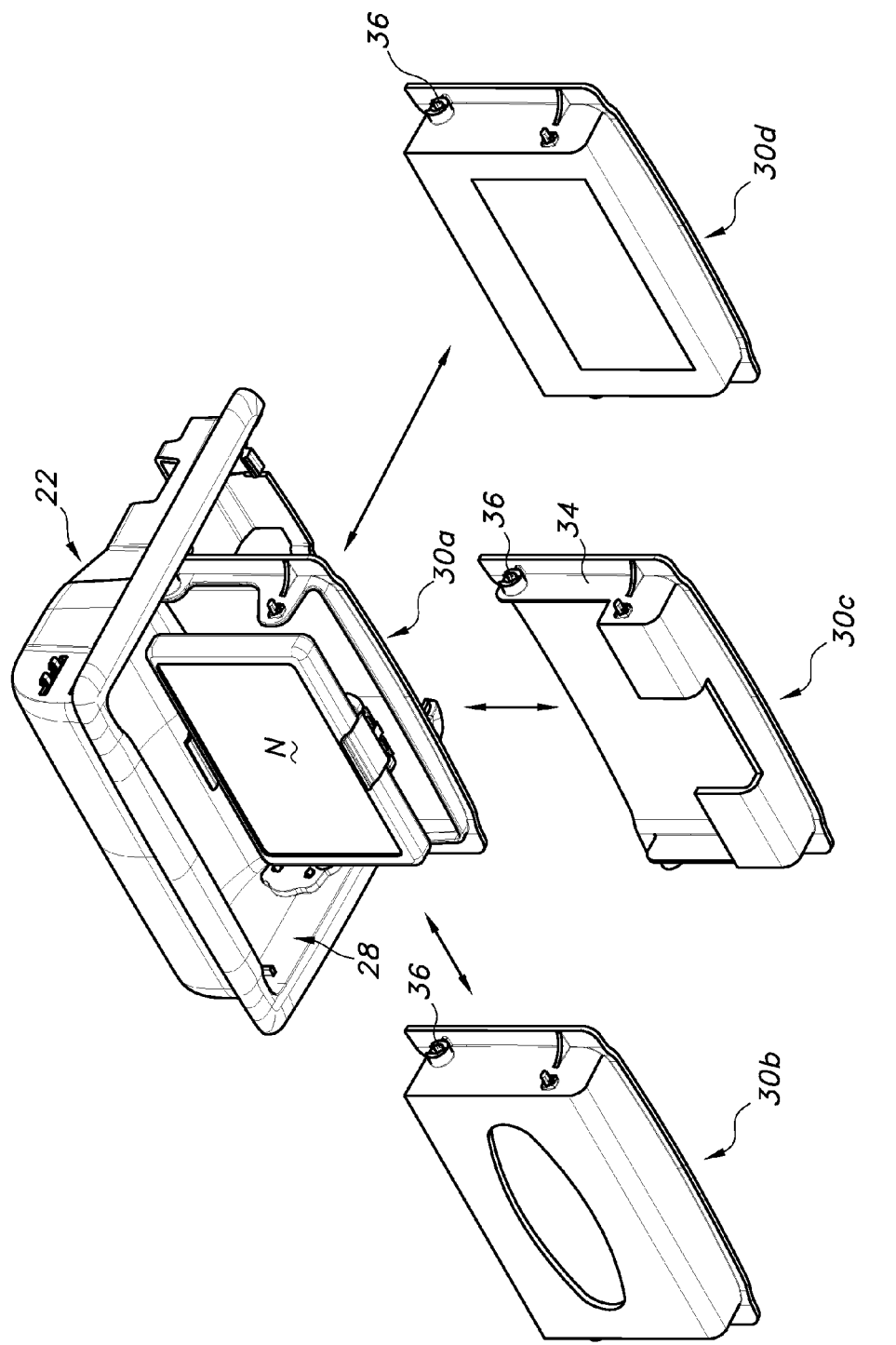
FIG. 5 illustrates various embodiments of interchangeable drop-down storage bins/holders according to the present disclosure.

As will be appreciated, the above-described features provide a simple, reliable system of interchangeable storage bin modules 30 for use with an overhead console housing 22. In the embodiments of FIG. 5, various storage bin modules 30 are depicted including a GPS/navigational device holder 30a, a tissue dispenser or tissue dispenser holder 30b, a sunglass holder 30c, and a conversation mirror or conversation mirror holder 30d. Of course, other configurations for storage bin modules 30 are possible and contemplated, including for as a coin dispenser holder or as a dedicated coin dispenser, a personal music player holder, a cellular telephone or smartphone holder, and others. To change between storage bin types, a user need only pull down on the currently installed storage bin module 30a to disengage pins 40a, 40b (not visible in this view) from receivers 36, and snap in a different storage bin module 30.

Still more, the skilled artisan will appreciate that the overhead console housing 22 and/or the storage bin modules 30 may be provided with integrated necessary electronics for charging various electronic devices such as cellular telephones/smartphones, GPS/navigation devices, personal music players, etc. whereby the storage bin 30 may serve as a docking/charging station, by the simple expedient of providing one or more suitable integrated charging ports adapted to charge various electronic devices. Non-limiting examples include one or more USB ports of varying configurations, 12V power outlets, and the like. As will be appreciated, storage bins 30 according to the foregoing description may be provided by the vehicle manufacturer, but also by various manufacturers of aftermarket parts and accessories for vehicles.

The foregoing has been presented for purposes of illustration and description. It is not intended to be exhaustive or to limit the embodiments to the precise form disclosed. Obvious modifications and variations are possible in light of the above teachings. For example, the foregoing description describes embodiments all relating to an overhead console. However, the skilled artisan will readily appreciate that the disclosure is equally applicable to other arrangements providing interchangeable storage bins as described, including driver and/or passenger door-mounted console storage bins, center-stack console mounted storage bins, vehicle dashboard-mounted console storage bins, and others. All such modifications and variations are within the scope of the appended claims when interpreted in accordance with the breadth to which they are fairly, legally and equitably entitled.

What is claimed:

1. An overhead console assembly for a vehicle, comprising:
   a plurality of interchangeable pivoting drop-down storage bin modules each defining at least receivers and a differently sized or shaped bin or holder;
   a housing defining at least an overhead storage cavity adapted to receive the plurality of interchangeable storage bin modules;
   pivot pins each including a first end adapted to be rotatably received in the housing and a second end adapted to be engaged by a one of the receivers; and
   a biasing member configured to apply a closing force to a one of the pivot pins.

2. The assembly of claim 1, wherein the receivers provide a snap-fit engagement of the pivot pin second end.

3. The assembly of claim 1, further including a damper configured to provide a smooth opening motion of a one of the plurality of interchangeable storage bin modules received in the housing storage cavity.

4. The assembly of claim 3, wherein the damper is a spring-loaded rotational gear associated with the housing and a cooperating pivot pin gear meshing with the rotational gear.

5. The assembly of claim 4, wherein the cooperating pivot pin gear is integrally formed in the first end of a one of the pivot pins.

6. The assembly of claim 5, wherein the first end of another of the pivot pins is associated with the biasing member.

7. The assembly of claim 6, wherein the biasing member is a torsion spring held at a first end by a slot or a pin in the housing and at a second end by a slot in the pivot pin first end.

8. The assembly of claim 1, wherein each of the plurality of interchangeable storage bin modules is independently configured to hold a different item.

9. The assembly of claim 8, wherein each of the plurality of interchangeable storage bin modules is independently configured to define a sunglasses holder, a coin dispenser, a conversation mirror, a conversation mirror holder, a GPS/navigation device holder, a personal music player holder, or a cellular telephone or smartphone holder.

10. A motor vehicle including the assembly of claim 1.

11. An overhead console for a vehicle, comprising:
- a housing defining at least an overhead storage cavity adapted to receive a plurality of interchangeable storage bin modules and opposed slots for rotatably receiving a pair of pivot pins;
- a plurality of interchangeable pivoting drop-down storage bin modules each defining at least a differently sized or shaped bin or holder and a pair of opposed receivers each configured for a snap-fit engagement of a one of the pair of pivot pins;
- first and second pivot pins each including a first end adapted to be rotatably received in the overhead console opposed slots and a second end adapted to be non-rotatably engaged by a one of the receivers;
- a biasing member configured to apply a closing force to a one of the plurality of interchangeable storage bin modules received in the housing storage cavity; and
- a damper associated with the second pivot pin, configured to provide a smooth opening motion of the one of the plurality of interchangeable storage bin modules received in the housing storage cavity.

12. The overhead console of claim 11, wherein the damper is a spring-loaded rotational gear associated with the housing and a cooperating second pivot pin gear meshing with the rotational gear.

13. The overhead console of claim 12, wherein the cooperating second pivot pin gear is integrally formed in the second pivot pin.

14. The overhead console of claim 11, wherein the first pivot pin first end is associated with the biasing member.

15. The overhead console of claim 14, wherein the biasing member is a torsion spring held at a first end by a slot or a pin in the housing and at a second end by a slot in the first pivot pin first end.

16. The overhead console of claim 11, wherein each one of the plurality of interchangeable storage bin modules is independently configured to hold a different item.

17. The overhead console of claim 16, wherein each one of the plurality of interchangeable storage bin modules is independently configured to define a sunglasses holder, a coin dispenser, a conversation mirror, a conversation mirror holder, a GPS/navigation device holder, a personal music player holder, or a cellular telephone or smartphone holder.

18. A vehicle including the overhead console of claim 11.

\* \* \* \* \*